United States Patent [19]

Tanner

[11] 4,006,872

[45] Feb. 8, 1977

[54] ELECTRICAL CONNECTOR ASSEMBLY

[75] Inventor: Robert Ivins Tanner, Columbus, Ohio

[73] Assignee: Bell Telephone Laboratories, Incorporated, Murray Hill, N.J.

[22] Filed: Feb. 23, 1976

[21] Appl. No.: 660,417

[52] U.S. Cl. .............................. 248/27.1; 248/201; 339/128; 339/134

[51] Int. Cl.$^2$ ......................... G12B 9/08; H02B 104

[58] Field of Search ............... 248/27 A, 27 R, 201; 339/126 R, 128, 134

[56] References Cited

UNITED STATES PATENTS

| | | | |
|---|---|---|---|
| 2,800,698 | 7/1957 | Wood | 248/27 A X |
| 3,459,396 | 8/1969 | Buttriss | 339/126 R X |
| 3,824,552 | 7/1974 | Kirby | 339/128 |

FOREIGN PATENTS OR APPLICATIONS

| | | | |
|---|---|---|---|
| 720,817 | 12/1954 | United Kingdom | 248/27 A |

*Primary Examiner*—Roy Lake
*Assistant Examiner*—E. F. Desmond
*Attorney, Agent, or Firm*—William H. Kamstra

[57] ABSTRACT

An electrical connector assembly adapted to be removably secured to a supporting mounting plate and featuring mounting clip spring adjustments to accommodate variations in mounting plate thickness. Mounting clips at each end of the assembly are each provided with a horizontal flange having slightly downturned ends adapted to make spring action engagement with one surface of a mounting plate. Each clip also has a blade adapted for insertion into an access slot of the mounting plate, the blade having deflectable shoulders for engaging the opposite surface of the mounting plate. Mounting plate thickness variations may thus be accommodated by the spring action of both the flange ends and the shoulders as the mounting plate is gripped therebetween.

1 Claim, 7 Drawing Figures

ELECTRICAL CONNECTOR ASSEMBLY

BACKGROUND OF THE INVENTION

This invention relates to electrical connector assemblies and more particularly to connector assemblies which are removably secured to a supporting chassis and the like. More specifically, the invention also relates to deflectable clip elements for thus removably securing a connector assembly.

Electrical connector assemblies adapted to provide for large numbers of electrical connections are well-known and are widely employed in the electronics and communications arts. Typically, a connector assembly comprises a socket subassembly affixed to a chassis or other mounting panel, which socket subassembly in turn comprises a plurality of electrical terminals extending therefrom, each provided with a individual terminal socket and a housing for carrying the terminals. The connector assembly further comprises a plug adapted to mate with the socket assembly for completing electrical connections between a cable and the electrical terminals. In the past, the connector socket housing has been affixed to its supporting mounting by fastening means such as clips retained by screws, for example, which more or less permanently retained the housing in place. The obvious disadvantage of such a mounting arrangement is that the socket housing is not quickly removable and replaceable. Screws may be dropped and lost and, in any event, initial installation, replacement, and repair were time-consuming and therefore costly.

One arrangement for alleviating the connect and disconnect problem of the socket housing is described in the patent of E. Kirby, No. 3,824,552 issued July 16, 1974, and provides for the mounting of the socket housing by snap-in action. Two spring clips are permanently secured to opposite ends of the housing, which clips have outwardly extending blades adapted for insertion in the access aperture of the mounting plate of the chassis or panel. The blades of the clips are provided with shoulders extending from a neck portion thereof, which shoulders are adapted to engage the under or opposite surface of the mounting plate when the clips are snapped into place by spring action. The spring action of the clips permits insertion in the plate aperture by manually deflecting the clip blades inwardly, which blades, upon release restore outwardly to engage the mounting plate surface. The housing is removed by again deflecting the clip blades inwardly to free the blade shoulders from engagement with the mounting plate. Manifestly, to ensure a firm and positive seating of the socket housing, the dimensions of the clip are determined by, and conditioned upon, the thickness of the mounting plate. Thus, the distance from the clip blade shoulders to the mounting flange of the socket housing must be the same as, or very closely approximate, the mounting plate thickness, or the blade shoulders of a clip will fail to engage the plate surface. If the shoulder-to-mounting dimension is too large, the shoulders will fail to contact the plate surface, and the housing will be only loosely retained. On the other hand, if that dimension is too small, the clip shoulders will be prevented from engaging the plate surface and the housing will not be locked in place.

In an ideal case where uniformity in the thickness of the mounting plates could be ensured, the dimension disparity problem pointed out in the foregoing need not arise. In practice, however, it has been found that mounting plate thickness may vary from installation to installation even where a given thickness is specifically prescribed due to the thickness tolerance permitted. As a result, considerable difficulty has been encountered in adapting a standard socket housing and mounting clip assembly for general use in a wide range of chassis or panel applications even where the plate thickness is also standardized. Incomplete engagement of the clip shoulders has resulted, for example, in a loose mounting and rocking of the socket housing on a mounting plate and even complete dislodgement of the socket housing assembly when a mated plug assembly is withdrawn. In mobile installations and the like, vibration of the entire connector assembly in its mounting plate is another undesirable consequence of a defective mounting clip fit.

It is accordingly an object of this invention to ensure a rigid and positive locking of a connector socket housing on its supporting mounting plate within a reasonable range of plate thickness variations while maintaining the housing quickly removable and replaceable.

Another object of this invention is to provide a connector assembly quick-connect mounting clip adapted to accommodate a reasonable range of mounting plate thickness variations.

Still another object of this invention is an improvement in a quick-connect electrical connector assembly over those hitherto known which facilitates insertion and removal of the socket housing from its mounting plate and yet ensures positive locking of the housing in place.

SUMMARY OF THE INVENTION

The foregoing and other objects of this invention are realized in one illustrative electrical connector arrangement which comprises a typical terminal housing having provided at each of opposite ends thereof a mounting clip presenting a deflectable blade outwardly extending from the housing in the direction of its electrical terminals in the manner of the mounting clips described in the afore-cited Kirby patent. The mounting clips are formed substantially L shaped to present flanges which are fixedly secured to the underside of corresponding flanges extending from each end of the connector housing in planes parallel to the plane of the mounting plate to which the housing is to be secured. The other legs of the L shaped clips comprise the deflectable blades referred to in the foregoing which are adapted for insertion through opposite sides of a substantially rectangular access slot provided in the mounting plate.

As in the afore-cited Kirby connector arrangement, a mounting clip blade presents a neck portion and a pair of shoulders extending outwardly therefrom, the neck portion being adapted to fit in an inset of the plate slot and the shoulders being adapted to make contact engagement with the surface of the mounting plate opposite from the plate side from which the blades are inserted. To overcome the problems presented by prior, known mounting clip arrangements discussed in the foregoing, a mounting clip according to this invention advantageously provides for two adjustments to accommodate variations in mounting plate thickness.

A first adjustment is achieved by the construction of the clip mounting flange. The ends of the mounting flange are slightly down-turned to present a pair of deflectable spring ends which, when the socket housing is pressed into its access slot, may be flattened to the extent necessary for the clip shoulders to pass under the surface of the mounting plate. A second adjustment is achieved by the construction of the shoulders themselves. The shoulders are partially split from the neck portion of the clip blade to present bifurcations on each side, the shoulders being slightly deflected outwardly (considering the housing extremity) from the plane of the blade. As a result, by spring action, the shoulders may be further deflected from that plane as the blade is released after insertion to accommodate further the thickness of the mounting plate when the plate thickness is greater than that normally encountered. By maintaining the dimension between the mounting flange spring ends and the blade shoulders equal to or slightly smaller than the thickness of the thinnest mounting plate reasonably to be encountered, a connector socket assembly according to this invention is advantageously adapted for use with a wide range of mounting plate variations.

BRIEF DESCRIPTION OF THE DRAWING

The foregoing and other objects and the features of this invention will be better understood from a consideration of the detailed description of the organization and installation of illustrative embodiments thereof which follow when taken in conjunction with the accompanying drawing, in which.

DETAILED DESCRIPTION

Figure 1:
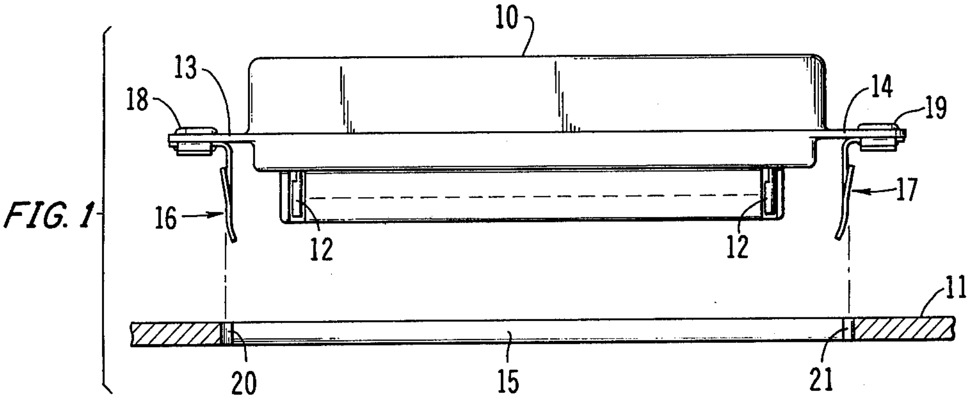
FIG. 1 depicts in side view an electrical socket assembly incorporating mounting clips according to this invention, the assembly being shown in alignment with and preparatory to, insertion in a mounting plate shown in cross-section.
Figure 2:
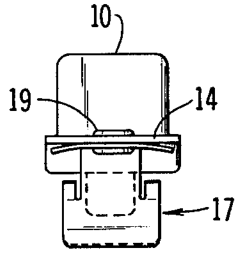
FIG. 2 is an end view of the socket assembly of FIG. 1.

In FIG. 1 is shown in side view a connector socket assembly 10 adapted for locking engagement with a mounting plate 11, a portion of which is shown in cross-section. The details of the socket assembly 10 are well-known in the art and include a housing within which are contained the individual terminal sockets and their external terminals, representative terminals 12 of which are shown in the drawing. The socket assembly 10 may typically comprise an assembly of the character described in the Kirby patent cited in the foregoing and is adapted to receive a plug assembly also of the character there described. Since the plug assembly need not be described for a complete understanding of this invention, its details are omitted and it is not shown in the drawing. In one specific, illustrative connector arrangement, the socket housing is provided with a pair of outwardly extending flanges 13 and 14 lying in a plane parallel to the plane of the mounting plate 11 in which the socket assembly 10 it to be supported. The plate 11 has provided therein a substantially rectangular aperture or slot 15 of sufficient dimensions to receive the lower terminal supporting body of the assembly 10. In its longer dimension, the slot 15 is determined as sufficient to admit a pair of locking clips 16 and 17, extending outwardly from the housing of assembly 10 in a direction perpendicular to the plane of the flanges 13 and 14 to which flanges the clips 16 and 17 are respectively affixed by ay convenient means such as, for example, rivets 18 and 19. The slot 15 at each end presents an inset 20 and 21 for receiving portions of the clips 16 and 17 in a manner to be described in detail hereinafter. the relationship of the locking clips 16 and 17 with the socket assembly 10 is shown more clearly in the end view of FIG. 2 where the clip 17 is shown as centrally affixed to the flange 14 by rivet 19.

Figure 4:
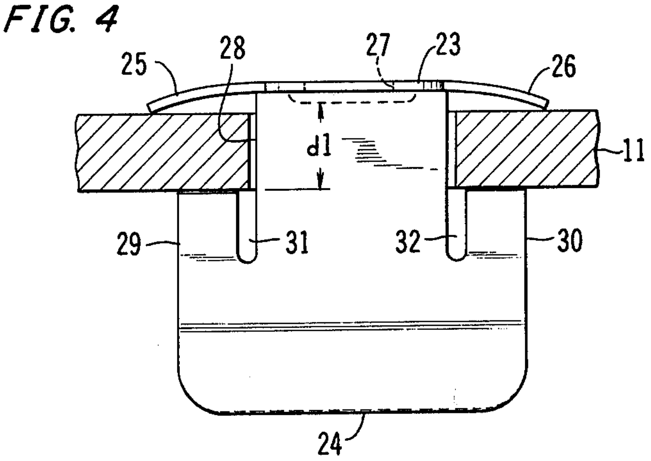
FIG. 3, 4, and 5 are side, front, and bottom views, respectively, of a mounting clip according to this invention, the clip being shown in FIG. 4 in connection with a cross-section of a fragmentary portion of a mounting plate, the clip also being shown somewhat enlarged in each view more clearly to depict its details.
Figure 3:
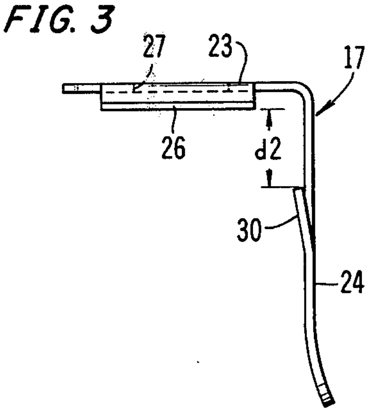
Figure 5:
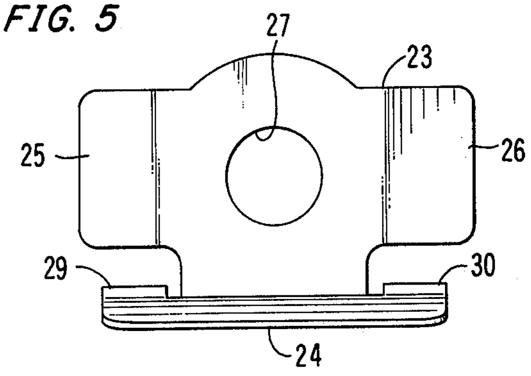

The character and advantageous features of the clips 16 and 17 are more clearly shown in the side, front, and bottom views of FIG. 3, 4, and 5, respectively, the clip 17 being depicted as representative and somewhat enlarged to point out its details. As there shown, the clip 17 is generally L shaped to present a mounting flange portion 23 and a blade 24. The mounting flange 23 is formed to present a pair of slightly downturned ends 25 and 26 and may be provided with an aperture 27 to admit a fastening rivet or screw. The blade 24 extends downward from flange 23, as viewed in the drawing, as a narrower neck 28 from which extend outwardly a pair of shoulders 29 and 30. The latter shoulders are separated from the neck by bifurcations 31 and 32 to permit a slight inward deflection of the shoulders 29 and 30 about a pivot at the bases of the shoulders. The clips are stamped or otherwise suitably formed of a material permitting spring action so that the flange ends 25 and 26 may be flexed upwardly and so that the shoulders 29 and 30 may be further deflected without permanent deformation of the clip structure. The entire blade 24 is also deflectable inwardly (as seen in its mounted position) to permit insertion of the socket assembly 10 in the access slot 15 of mounting plate 11.

Figure 6:
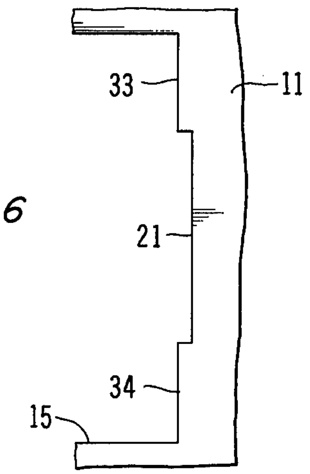
FIG. 6 depicts a fragment of the mounting plate of FIG. 1 enlarged to show the details of one end of an access slot therein.

Returning to the view of FIG. 1, the socket assembly 10 is seen in a position of alignment with the slot 15 of mounting plate 11 preparatory to its insertion in place. This is accomplished by inserting the clips 16 and 17 in the respective ends of slot 15 which is dimensioned to admit the clips 16 nd 17 without deflection only at the insets 20 and 21. More specifically and with particular reference to FIG. 4 and 6, the end sides of the slot 15 present a pair of shoulders formed by the insets 20 and 21, such as the shoulders 33 and 34 shown in connection with a fragmented portion of the plate 11 also enlarged to indicate the relationship with the clip 17 of FIG. 3, 4, and 5. As the clips are inserted in the slot 15, the shoulders of the slot at each end deflect the blades of the clips 16 and 17 inwardly. As the socket assembly 10 is pressed further into the access slot 15 against the spring action of the flange ends, such as the ends 25 and 26 of clip 17, the clip shoulders 29 and 30 clear the under surface of mounting plate 11. The width of the slot insets is just sufficient to admit the neck portions of the clips 16 and 17 as shown in FIG. 4. As a result, as the clip shoulders clear the mounting plate under-surface, the clip blades restore by spring action and the clip necks snap into place in the slot insets. As the socket assembly 10 is released, the spring action of the flange ends 25 and 26 of clip 17, for example, urge the clip shoulders positively against the undersurface of mounting plate 11 and the assembly 10 is now firmly locked in place. Insertion of the clip blades is facilitated by a slight inward curvature of the clip blades to permit a sliding action against the slot shoulders.

In order to achieve as wide an application as possible for the socket assembly according to this invention, the dimension dl between the top of the clip shoulders and the underside of the clip fastening means, such as a rivet upset shown in dashed outline in FIG. 4, is determined as greater than the greatest thickness of any mounting plate reasonably to be encountered. Similarly, the dimension d2 between the clip flange ends and the clip shoulder tops in their unsprung states is determined as less than the least thickness of any mounting plate to be encountered. Advantageously, the initial permanent deflection of the clip shoulders from the plane of the clip blades also permits a more positive capture of the mounting plate under surface. In practice this becomes important to prevent accidental loosening of the assembly from its support. Without the permanent deflection of the clip shoulders, these would capture the mounting plate under-surface only by the depth of the slot insets and any slight variation in either the length of the slot 15 or the assembly distance between the clip blades could result in an insecure locking of the socket assembly. In the event that the thickness of a mounting plate exceeds the dimension d1, a further deflection of the clip shoulders from the planes of the blades will additionally adjust that dimension to accommodate the unexpected mounting plate thickness.

Figure 7:
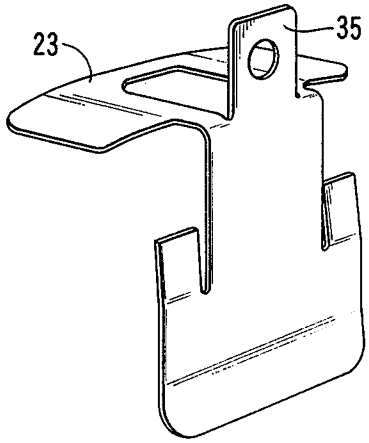
FIG. 7 depicts another mounting clip according to this invention adapted for an alternate manner of securing it to an assembly housing.

In the foregoing a socket-mounting clip assembly has been described in which the clips are typically affixed to flanges extending outwardly from the assembly housing. In FIG. 7 is shown a mounting clip in accordance with the principles of this invention which is adapted for mounting on the vertical side of a housing. The exemplary clip there shown, although essentially L shaped, is provided with a vertical tab 35 lifted from the flange 23, or otherwise affixed thereto, which tab may be affixed to a vertical mounting surface by rivet or screw means, for example.

What have been described are considered to be only specific illustrative embodiments of this invention and it is to be understood that various and numerous other arrangements may be devised by one skilled in the art without departing from the spirit and scope thereof as defined by the accompanying claim.

What is claimed is:

1. A locking clip for removably securing a housing in an opening in a supporting mounting plate comprising a neck portion having a pair of mutually perpendicular legs, a flange extending from one leg of said pair of legs having a first pair of spring ends extending outwardly from respective sides of said one leg, each of said first pair of spring ends being deflected from the plane of said flange in the direction of the other leg of said pair of legs, and a blade portion extending from said other leg, said blade portion being formed to present a pair of shoulders extending at right angles outwardly from respective sides of said other leg, said shoulders being disjoined from said other leg for a partial length of said blade portion to present a second pair of spring ends, each of said second pair of spring ends being deflected from the plane of said blade portion in the direction of said one leg of said pair of legs, the ends of said first pair of spring ends and the ends of said second pair of spring ends being spaced apart a predetermined dimension, said first and second pairs of spring ends being flexible to grip therebetween a mounting plate having a thickness greater than said predetermined dimension.

* * * * *

UNITED STATES PATENT AND TRADEMARK OFFICE
CERTIFICATE OF CORRECTION

PATENT NO. : 4,006,872

DATED : February 8, 1977

INVENTOR(S) : Robert I. Tanner

It is certified that error appears in the above-identified patent and that said Letters Patent are hereby corrected as shown below:

Column 1, line 18, "a" should read --an--. Column 2, line 43, "L" should read --"L"--; line 48, "L" should read --"L"--. Column 4, line 9, "ay" should read --any--; line 13, "the", first occurrence, should read --The--; line 22, "L" should read --"L"--. Column 5, line 7, "dl" should read exactly the same except the numeral should appear in bold type. Column 6, line 2, "L" should read --"L"--.

Signed and Sealed this

Thirty-first Day of May 1977

[SEAL]

*Attest:*

RUTH C. MASON
*Attesting Officer*

C. MARSHALL DANN
*Commissioner of Patents and Trademarks*